Figure 4:
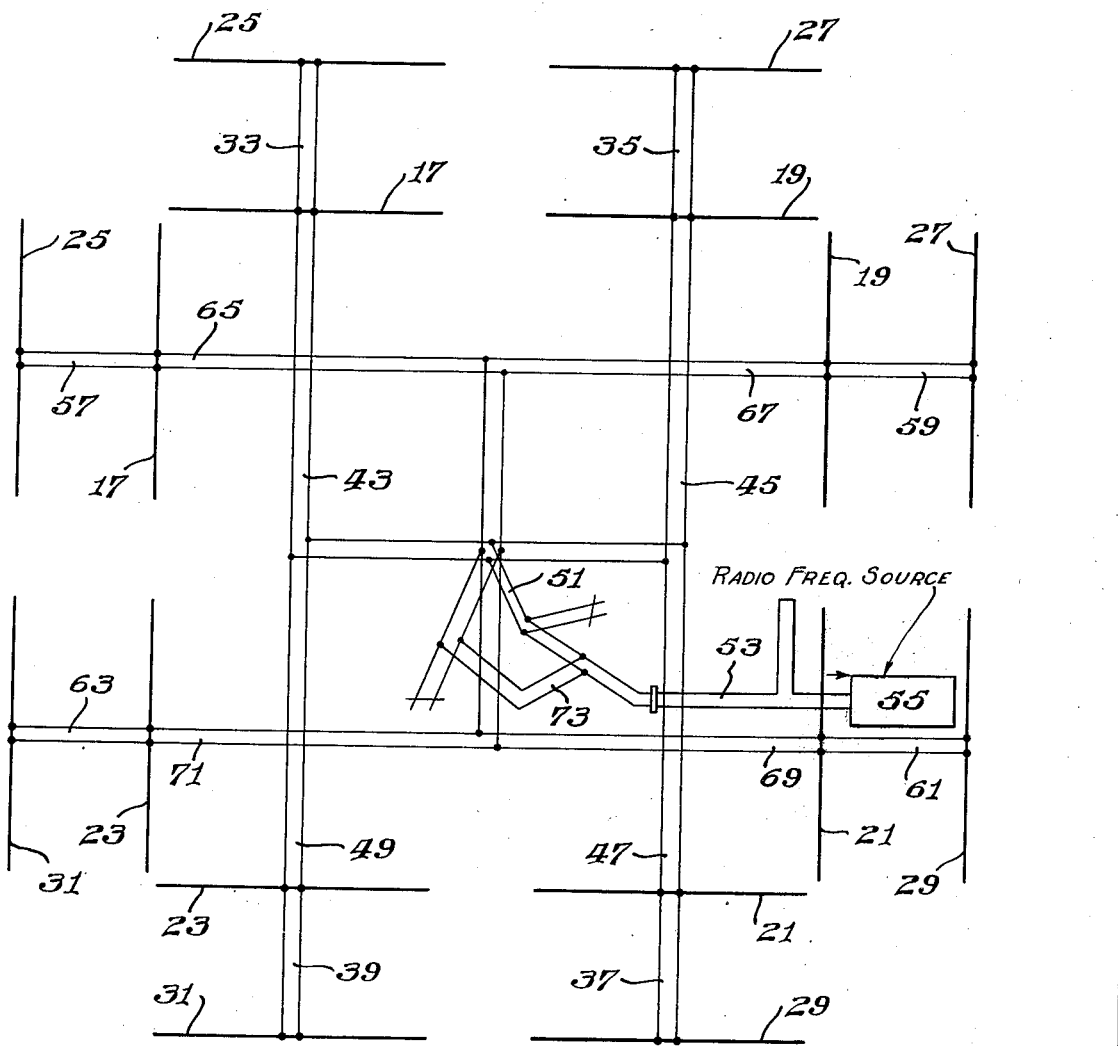

Jan. 13, 1942.  E. A. LAPORT  2,270,130
DIRECTIVE ANTENNA SYSTEM
Filed Aug. 30, 1940  2 Sheets-Sheet 1
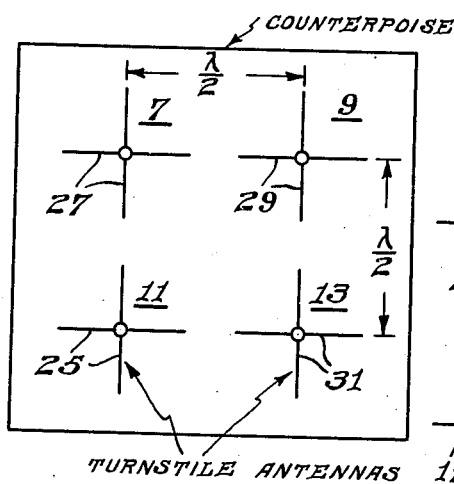
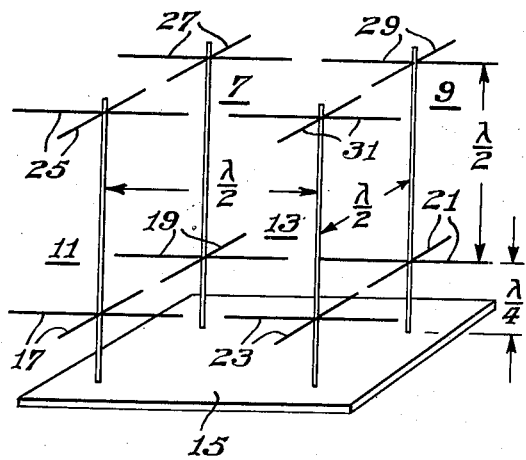
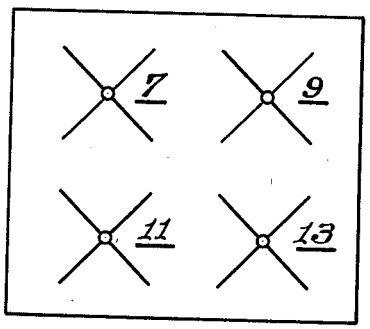
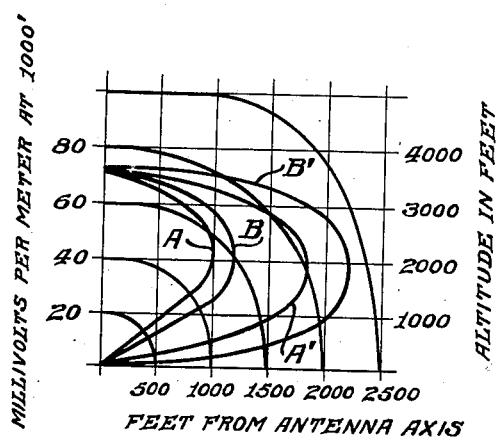
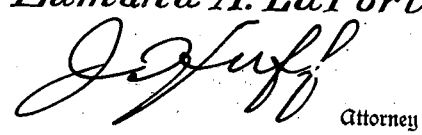
Inventor
Edmund A. LaPort
By
Attorney Jan. 13, 1942.  E. A. LAPORT  2,270,130
DIRECTIVE ANTENNA SYSTEM
Filed Aug. 30, 1940  2 Sheets-Sheet 2

Inventor
Edmund A. LaPort
By
Attorney

Patented Jan. 13, 1942

2,270,130

UNITED STATES PATENT OFFICE 2,270,130

DIRECTIVE ANTENNA SYSTEM

Edmund A. Laport, Montreal, Quebec, Canada, assignor to Radio Corporation of America, a corporation of Delaware Application August 30, 1940, Serial No. 354,869

7 Claims. (Cl. 250—11)

This invention relates to directive antenna systems, and has as its principal object the provision of an improved marker beam for aircraft.

Marker beams are used in guiding aircraft to blind landings, or the like, by giving the pilot a warning signal when he is over a predetermined point which he may readily identify. Early systems used the inherent directive characteristic of a vertical radiator to provide such an indication operated by the failure of the signal when the plane was directly in line with the dipole conductors and therefore on the axis of zero radiation known as the "cone of silence," identified with existing radio range stations. In flying over such a radio range antenna system of the Adcock type, the signal intensity suddenly decreases to zero and is restored again when the plane passes through the cone of silence. It will be appreciated that this system is liable to give a false indication of position if for any reason the radio range transmitter or the receiver in the plane failed momentarily. In either case, the sudden decrease and increase in signal strength could easily be mistaken for the cone of silence.

A so-called "negative cone of silence" system was therefore adopted in practice for instrument flying in which a narrow beam was directed upward through the plane's course, the presence of a signal rather than its absence being used to operate the indicating mechanism. Two pairs of colinear mutually perpendicular horizontal dipoles have been used for this purpose. This system, however, is not entirely satisfactory, for the reason that its directivity is not very sharply defined, with the result that the change in signal intensity along a line over the antenna is not sufficient to provide an accurate indication of position.

It is therefore a further object of this invention to provide an improved antenna system for radiating a vertically directed beam having a highly directional characteristic which may be received by an aircraft flying in any direction.

A further disadvantage which has been found to exist in marker beams previously known is that side radiations of sufficient intensity are produced which may give a false position indication when the plane is not directly over the marker antenna. The amplitude of such side radiations or lobes must be kept to a minimum. It is, therefore, a further object of this invention to provide a marker beacon which is particularly free from side radiations.

The foregoing objects of this invention are accomplished by means of a radiating system comprising a plurality of "turnstile" antennas spaced approximately a half wave length apart, each turnstile comprising a plurality of vertically disposed pairs of crossed horizontal dipoles energized so as to produce a rotating radiation field having a sharp directivity in a vertical direction and minimum radiation in a horizontal direction. In practice, the turnstile radiators have been spaced by 180° to obtain additional sharpening of the main beam without noticeable introduction of the parasitic lobes.

This invention will be better understood from the following description when considered in connection with the accompanying drawings in which Figure 1 is a plan view of an embodiment of this invention; Figure 2 is a perspective view of the same embodiment; Figure 3 is a plan view of an alternative embodiment; Figure 4 is a schematic circuit illustrating a preferred system for energizing a beacon antenna of the type herein described; and Figure 5 is a curve showing the relative radiation characteristics of a horizontal dipole marker beam and a beam produced in accordance with the present invention.

Similar reference numerals refer to similar parts throughout the several figures of the drawings.

Referring to Figs. 1 and 2, four turnstile antennas 7, 9, 11 and 13 are mounted above a counterpoise 15, the vertical axes of the antennas being at the corners of a square a half wave length on a side. The term "turnstile" antenna, as used herein, is intended to refer to an antenna which is the equivalent of the type disclosed by G. H. Brown in his U. S. Patent 2,086,976, for example, although it is to be clearly understood that the structural arrangement need not be the same and that the phasing of the radiating elements may be different. Essentially, a "turnstile" antenna comprises a plurality of vertically disposed pairs of crossed horizontal dipoles at intervals of a half wave length. For high frequency work, a rigid unitary pipe construction is preferred, since, as pointed out in the above-identified Brown patent, the dipole elements may be connected directly to a grounded central metallic mast without insulation. It is to be understood, however, that the antenna may also comprise insulated wire dipole elements suspended in the air from suitable towers in accordance with the well-established practice.

A complete beacon antenna structure includes eight crossed dipoles, the lower four, 17, 19, 21 and 23, are mounted a quarter wave above the counterpoise screen 15, while the upper four, 25, 27, 29 and 31, are parallel to and a half wave length above the lower dipoles. The counterpoise 15 is conventional, and may consist of a wire screen, solid plate, or system of wires. It is preferably larger in area than the antenna system itself.

As is well known, each arm or element of each dipole is approximately a quarter wave length long. Since the turnstiles are a half wave apart, it is apparent that adjacent ends of the dipoles may be quite close to each other. While this may be unimportant, it is possible that a discharge will occur across the gap since opposite ends are at instantaneously opposite potentials. This possibility may be avoided by rotating each turnstile 45°, as illustrated in Fig. 3. The directional pattern is not altered by rotating the dipoles in this manner, and the spacing between adjacent ends is increased somewhat.

In the Brown turnstile referred to above, the successive crossed dipoles were interconnected by a transmission line which was transposed between each pair. Since the phase of the energizing current goes through a phase reversal in each half wave length of line, the crossover restores the original phase so that corresponding dipole elements are in time phase. In a horizontal plane, the radiation from the dipoles is therefore additive, while, in a vertical plane, the radiation of one cancels that of another because of their half wave spacing. Since vertical radiation is desired in the present case, and horizontal radiation is not wanted, it is necessary to phase the crossed dipoles to produce a condition of maximum radiation in a vertical direction in the manner to be described hereinafter.

The present antenna system is like the Brown turnstile in that the perpendicular dipoles of each pair are fed in phase quadrature to produce a rotating radio frequency field. However, in this case, the quadrature phasing is produced by grouping all radiation of the same orientation rather than separately in each individual turnstile. This arrangement makes possible reception of the beacon signal on a dipole receiving antenna without regard to the relative orientation of the beacon and receiving antennas.

The method of phasing the eight crossed dipoles is illustrated in Fig. 4 wherein the various parts are identified by the same reference numerals as in the preceding figures.

The upper east-west dipoles 25, 27, 29, 31 of each turnstile are connected by transmission lines 33, 35, 37 and 39, respectively, to the lower east-west dipoles 17, 19, 21 and 23. There is no transposition in this line so that the upper and lower dipoles will be in time phase opposition because of the phase reversal in the half wave length of line between them. The four lower (or upper) dipoles are connected in parallel by four lines 43, 45, 47 and 49 which are of equal electrical length so that the four groups are fed in the same phase. The four last-named transmission lines terminate at the end of one branch 51 of a feed line 53 which is coupled to a source of radio frequency energy 55.

The upper north-south dipoles 25, 27, 29 and 31 are connected by transmission lines 57, 59, 61 and 63, respectively, to the lower north-south dipoles 17, 19, 21 and 23. As before, there is no transposition in these lines so that the upper and lower north-south dipoles will also be in time phase opposition. The four lower (or upper) dipoles are connected in parallel by four lines 65, 67, 69 and 71 which are of equal electrical length so that the four groups are fed in the same phase. By the term "equal electrical length" is herein meant that the voltages at the ends of the four lines are all of the same phase. It will be appreciated that the lines will therefore be of the same physical dimensions or that they differ by an amount sufficient to rotate the phase a complete 360°, which is equivalent to no rotation.

The four lines terminate at the end of the other branch 73 of feed line 53. The electrical length of the feed line from the transmitter to the north-south dipoles differs from the electrical length of the line to the east-west dipoles by a quarter wave length. It will be appreciated that separate lines may be utilized to couple the antenna groups to the transmitter, or part of the line may be common to both, such as the section 53, the phase shift being accomplished in the branch sections 51 and 73.

As a result of the difference in length of the lines, the currents feeding the east-west dipoles are in time quadrature with the currents feeding the north-south dipoles to produce a rotating radiation field in the well-known manner.

I have found that a single two-element turnstile antenna, properly phased, radiates a vertically directed field, and the sharpness of the beam is greatly enhanced by the multiple turnstile arrangement herein proposed. Two turnstiles will produce a radiation field having a narrow beam in the plane of the two antennas, but a comparatively broad beam in a plane at right angles thereto. Four turnstiles disposed at the corners of a square produce a sharp vertical beam in both planes. The reason for the increase in sharpness is that, in a given vertical plane, the components of the two radiation fields add in a vertical direction, but, in a direction at an angle to the vertical, the resultant field is a function of a product which includes the sine and the cosine of the angle. At angles where the sine function alone is near unity, indicating only a slight decrease in field intensity for one turnstile alone, the cosine is small. Thus the effect of the second turnstile is to increase the vertical radiation and sharply decrease the radiation at an angle thereto. In a horizontal direction, the radiation is zero. The number of pairs of dipoles on each turnstile may be greater than 2 if desired. In such a case, the sharpness of the beam will be further increased.

The curves of Fig. 5 illustrate the improvement obtained by the present antenna system over a single horizontal dipole of the conventional type. The field strengths shown are those which would be measured on the surface of a hemisphere of 1000-foot radius with the antenna located at the center. The figure is also marked off in lines to indicate distances from the axis of the antenna (vertical) and altitudes above the ground. At a selected point, say 2000 feet altitude and 3000 feet from the vertical axis, the actual field intensity is read from the curve by correcting the indicated value at 1000 feet for the actual distance from the antenna. Since field intensity varies in inverse proportion to the distance, it is necessary only to multiply the intensity at 1000 feet by the ratio of the plotted distance to the actual distance. In the given case, therefore, using curve A', the field at 1000 feet is 21 MV/M, which, at 3600 feet, becomes $1000/3600 \times 21 = 7.2$ MV/M. The improvement in the sharpness of the beam, however, may be observed directly by comparing the curves A and B corresponding to the field in two perpendicular planes for the improved antenna system with the curves A' and B' corresponding to the corresponding fields produced by a horizontal dipole.

The improved antenna system has a greater gain than the double-dipole. The double-dipole curves A', B' correspond to field intensities for 5 watts input, while the curves A, B for the improved system correspond to field intensities for only 1¼ watts input, representing a power gain of 4:1 over the old system.

I have thus described a position marker antenna system having improved directional characteristics, together with a modification thereof. The invention itself, however, is not limited to the particular embodiments illustrated, but only by the spirit of the appended claims.

I claim as my invention:

1. A radiating system comprising four turnstile antennas located at the corners of a square a half wave length on a side, each of said turnstile antennas comprising two pairs of crossed dipoles vertically disposed a half wave length apart, each element of one pair being energized in approximately time phase opposition to the corresponding element of the other pair, and each dipole of each of said pairs of crossed dipoles being energized in phase quadrature with respect to its associated dipole.

2. In a system for radiating a concentrated field in a vertical direction, the combination comprising four turnstile antennas having their vertical axes at the four corners of a square a half wave length on a side, each of said four turnstile antennas comprising a plurality of vertically disposed pairs of crossed horizontal dipoles, means for energizing said dipoles to produce maximum radiation in a vertical direction, and means for establishing a phase quadrature relation between energizing currents for upper and lower dipoles lying in one plane with respect to currents energizing dipoles lying in a plane perpendicular thereto.

3. In a marker system for radiating a field in a vertical direction, the combination comprising four turnstile antennas having their vertical axes at the corners of a square a half wave length on a side, each of said turnstile antennas comprising a plurality of vertically disposed pairs of crossed horizontal dipoles lying in mutually perpendicular planes, transmission lines connecting each upper dipole of each turnstile to similarly oriented lower dipoles, a source of radio frequency for energizing said antenna system, transmission lines of similar electrical length connecting similarly oriented dipoles in two parallel-connected groups and transmission lines whose electrical lengths differ by a quarter wave length connecting said groups to said source.

4. In a marker system for radiating a radio frequency field in a vertical direction, the combination comprising a plurality of turnstile antennas spaced a half wave length apart, each of said turnstile antennas comprising a plurality of vertically disposed pairs of crossed horizontal dipoles, means including a source of radio frequency energy coupled to said dipoles for energizing said dipoles to produce maximum radiation in a vertical direction, and means for establishing a phase quadrature relation between energizing currents for upper and lower dipoles of each turnstile lying in one plane with respect to energizing currents for dipoles lying in a plane perpendicular thereto.

5. In a marker system for radiating a radio frequency field in a vertical direction, the combination comprising a purality of turnstile antennas spaced a half wave length apart, each of said turnstile antennas comprising a plurality of pairs of crossed horizontal dipoles vertically spaced a half wave length apart and lying in north-south and east-west planes, respectively, means for energizing said dipoles to produce maximum radiation in a vertical direction, and means for establishing a phase quadrature relation between energizing currents for dipoles lying in north-south planes with respect to currents energizing dipoles lying in east-west planes.

6. In a marker system for radiating a radio frequency field in a vertical direction, the combination comprising a plurality of turnstile antennas spaced a half wave length apart, each of said turnstile antennas comprising a plurality of pairs of crossed horizontal dipoles vertically spaced a half wave length apart and lying in north-south and east-west planes, respectively, means for energizing each dipole in time phase opposition to the corresponding dipole next below to produce maximum radiation in a vertical direction, and means for establishing a phase quadrature relation between energizing currents for dipoles lying in north-south planes with respect to current energizing dipoles lying in east-west dipoles.

7. In a marker system for radiating a radio frequency field in a vertical direction, the combination of a plurality of turnstile antennas spaced apart from one another by a distance of the order of a half wave length, each of said antennas comprising two pairs of crossed dipoles vertically disposed a half wave length apart, each element of one pair being energized in approximately time phase opposition to the corresponding element of the other pair, and each dipole of each of said pairs of crossed dipoles being energized in phase quadrature with respect to its associated dipole.

EDMUND A. LAPORT.